United States Patent [19]

Kimura et al.

[11] Patent Number: 4,537,275
[45] Date of Patent: Aug. 27, 1985

[54] VIBRATION RESPONSIVE MOUNTING ARRANGEMENT FOR AUTOMOTIVE ENGINE

[75] Inventors: Akira Kimura, Zushi; Masao Ishihama, Yokosuka; Toshiro Abe, Yokohama; Kiyoshi Shimada; Shinichi Matsui, both of Yokosuka, all of Japan

[73] Assignee: Nissan Motor Co., Ltd., Yokohama, Japan

[21] Appl. No.: 454,546

[22] Filed: Dec. 30, 1982

[30] Foreign Application Priority Data

Jan. 8, 1982 [JP] Japan .................. 57-927[U]

[51] Int. Cl.³ .............................................. B60G 17/00
[52] U.S. Cl. .................................. 180/300; 188/298; 280/707; 267/35; 123/192 R
[58] Field of Search ............... 267/35; 248/3, 6, 7, 248/8, 9; 180/300; 280/707, 714, 6.1; 188/298, 299; 123/192 R

[56] References Cited

U.S. PATENT DOCUMENTS

| | | | |
|---|---|---|---|
| 1,738,532 | 12/1929 | Harbour | 123/192 R |
| 4,076,275 | 2/1978 | Hiruma | 267/65 D |
| 4,154,206 | 5/1979 | Le Salver et al. | 123/192 R |
| 4,212,484 | 7/1980 | Fujii | 280/707 |
| 4,401,310 | 8/1983 | Ishikawa | 280/6.1 |
| 4,402,527 | 9/1983 | Kakehi et al. | 280/707 |

FOREIGN PATENT DOCUMENTS

| | | |
|---|---|---|
| 2737985 | 3/1978 | Fed. Rep. of Germany . |
| 2821493 | 11/1979 | Fed. Rep. of Germany . |
| 57-422 | 1/1982 | Japan . |
| 57-423 | 1/1982 | Japan . |

OTHER PUBLICATIONS

Kimura et al., U.S. Ser. No. 438,756, filed Nov. 3, 1982, entitled "Vibration Responsive Mounting Arrangement for . . . ".

Primary Examiner—Richard A. Bertsch
Attorney, Agent, or Firm—Schwartz, Jeffery, Schwaab, Mack, Blumenthal & Evans

[57] ABSTRACT

An arrangement wherein a valve or valves, which are either manually or automatically controlled, control the amount of hydraulic fluid discharged from a belt driven pulsation pump and forced into and out of a variable volume chamber arrangement which is connected in series with an elastomeric insulating member, whereby the desired vibration offsetting pressure pulsations may be produced in said chamber.

13 Claims, 19 Drawing Figures

| DISP. (X) | SOLENOID VALVES 100 | SOLENOID VALVES 94 |
|---|---|---|
| $X > X_0$ | OFF | ON |
| $X < X_0$ | ON | OFF |

FIG.17

| FORCE (F) | SOLENOID VALVES 92 | SOLENOID VALVES 98 |
|---|---|---|
| $F > F_0$ | OFF | ON |
| $F < F_0$ | ON | OFF |

VIBRATION RESPONSIVE MOUNTING ARRANGEMENT FOR AUTOMOTIVE ENGINE

BACKGROUND OF THE INVENTION

1. Field of the Invention

The present invention relates generally to an engine mounting arrangement and more specifically to an engine mounting arrangement which includes an elastomeric insulator having a variable volume chamber device associated therewith which chamber may be hydraulically pressurized/depressurized in a timed relationship with the most significant vibration of the engine and in response to changes in vibration amplitude and/or intensity thereof, which occur with change in engine operation.

2. Description of the Prior Art

Figure 1:
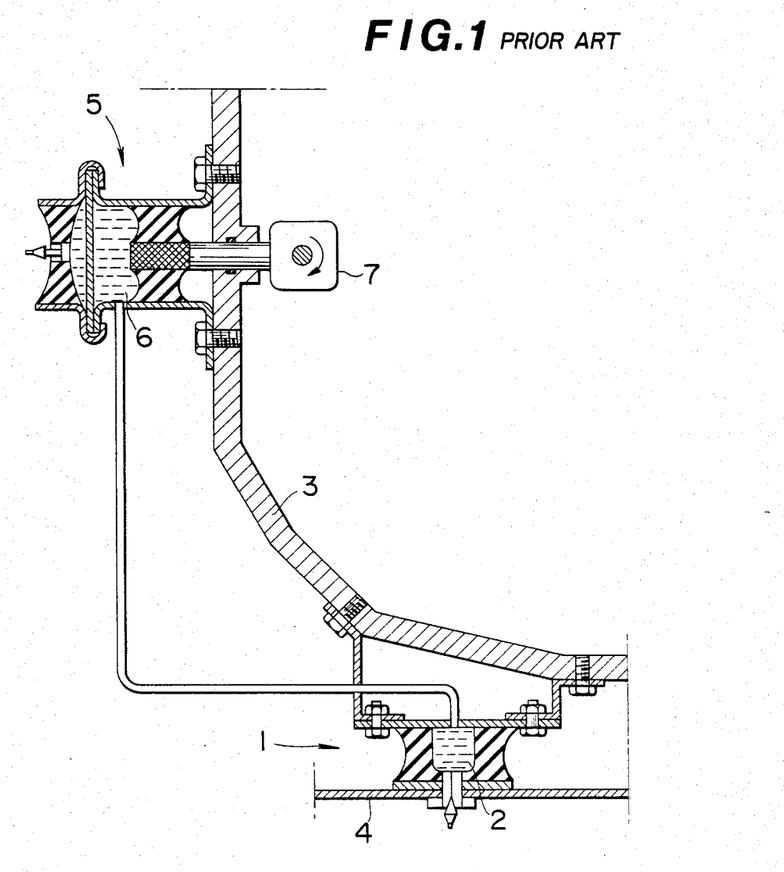
FIG. 1 is a sectional view of the prior arrangement discussed in the opening paragraphs of the invention.
Figure 2:
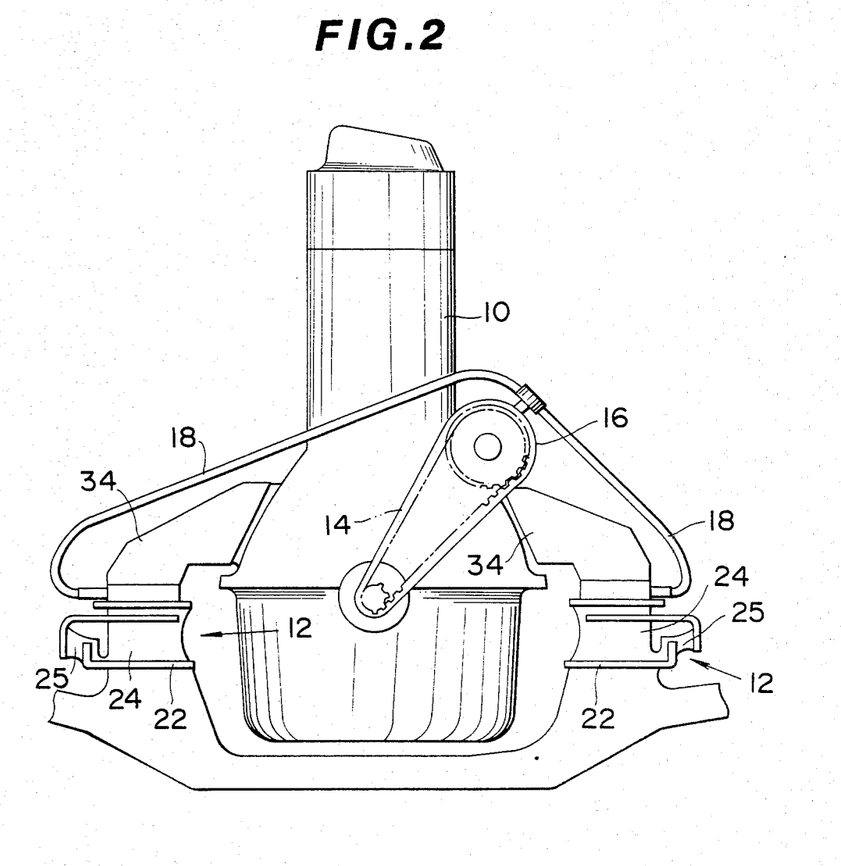
FIG. 2 is a front elevation of an engine equipped with a first embodiment of the present invention.

In a previously proposed dynamic spring constant reducing arrangement shown in FIG. 1 of the drawings, an elastomeric mounting insulator 1 having a hydraulic chamber 2 defined therein, is operatively interposed between an automotive engine 3 and the chassis 4. The hydraulic chamber 2 is fluidly communicated with an actuator arrangement 5 having a variable volume chamber 6 which is contracted and expanded in response to the rotation of a cam 7. The cam 7 in this instance is operatively connected to the crankshaft of the engine (not shown) so as to rotate in synchronism therewith.

The operation of this arrangement is such that, as the engine 3 vibrates in a manner to compress the insulator 1 and thus reduce the volume of the chamber 2 defined therein, the cam 7 is adapted to induce an expansion of the chamber 6 so as to relieve the pressure tending to develop in the chamber 2, and subsequently, as the engine moves away from the chassis 4 and the chamber 2 tends to expand, the cam 7 rotates to a position wherein the chamber 6 is contracted to prevent maintain the pressure in the chamber 2 and prevent same from falling due to the expansion thereof.

However, with this type of arrangement provision must be made within the engine per se, for a suitable shaft which is relatively close to the outer surface thereof and for a mounting site for the actuator device driven by the just mentioned shaft. Hence, the complexity of the engine construction has been unduly increased and further design limitations in that the number of suitable sites at which the actuator may be readily mounted is limited due to the need for the actuator to be relatively close to the shaft via which it is driven and by the limited amount of space available within the engine compartment about the engine, encountered.

Furthermore, this arrangement has been unable to allow for the various changes in vibration which occur with change in engine operation and vehicle running conditions.

A full and detailed disclosure of the above disclosed arrangement may be found in U.S. Pat. No. 4,154,206 issued on May 15, 1979 in the name of LeSalver et al.

SUMMARY OF THE INVENTION

It is accordingly an object of the present invention to provide an engine mounting or suspension arrangement which may be readily adjusted so as to compensate for mass production variations and changes which occur with time such as hardening or similar deterioration of elastomeric members constituting an important part of the arrangement and which does not unduly complicate the internal construction of the engine which it suspends.

The present invention features an arrangement wherein a valve or valves, which are either manually or automatically controlled, control the amount of hydraulic fluid discharged from a pulsation pump and forced into and out of a variable volume chamber arrangement which is connected in series with an elastomeric insulating member, whereby the desired level of vibration offsetting pressure pulsations may be produced in said chamber.

More specifically, the invention takes the form of a mounting arrangement for mounting a vibrating body on a base member comprising, an insulator supportingly interposed between the vibrating body and said base member, means defining a variable volume chamber, the variable volume defining means being connected in series with the insulator, a source of hydraulic fluid under pressure which source produces pressure pulsations in a timed relationship with a predominant vibration of the vibrating body, means fluidly interconnecting the source and the variable volume chamber and valve means in said fluidly interconnecting means for varying the amount of fluid fed into the variable volume chamber per pulsation.

BRIEF DESCRIPTION OF THE DRAWINGS

The features and advantages of the arrangement of the present invention will become more clearly appreciated from the following description taken in conjunction with the accompanying drawings in which.

DETAILED DESCRIPTION OF THE PREFERRED EMBODIMENTS

Turning now to FIGS. 2 to 6, a first embodiment of the present invention is shown. In this arrangement an engine 10 is suspended on a chassis 11 through insulator arrangements or units generally denoted by the numeral 12. Mounted on the side of the engine 10 and driven by a suitable toothed belt 14 is a pulsation pump 16. This pump (16) is fluidly connected with the insulating arrangements 12 via equal length conduits 18.

Figure 3:
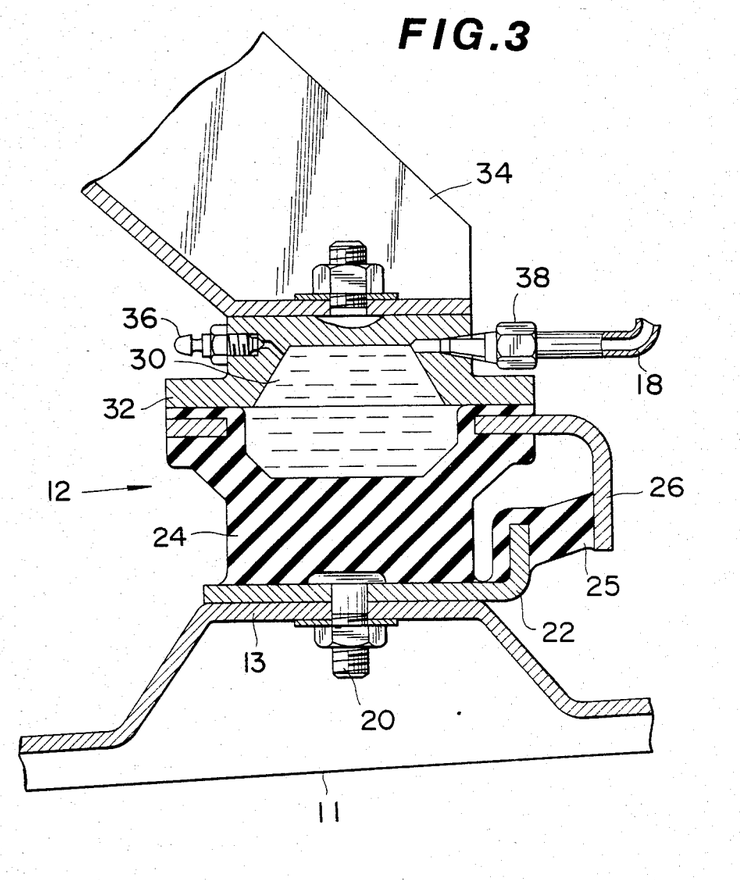
FIG. 3 is a cross-section of one of the mounting insulators used in the first embodiment.
Figure 4:
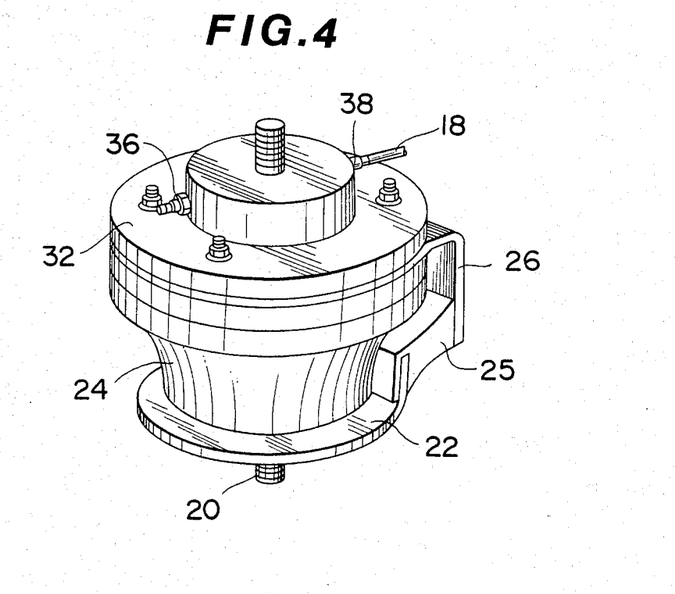
FIG. 4 is a perspective view of the insulator shown in FIG. 3.

FIG. 3 shows in cross section, one of the mounting insulator arrangements 12. As shown, each of the units is secured to a mounting bracket 13 welded or otherwise fixedly secured to the vehicle chassis 11 by a bolt 20. Each insulator further comprises a base mounting bracket 22 on which a main elastomeric member 24 is vulcanized (or otherwise permanently attached). A retaining bracket 26 is disposed about the upper portion of the main elastomeric member 24 and interconnected with the base mounting bracket 22 through a secondary elastomeric member 25. A chamber 30 is defined within the insulator partly by a recess formed in the main elastomeric member 24 and partly by a recess defined in a metallic cap 32 fixedly secured via vulcanizing or the like to the top of the elastomeric member 24. The cap 32 is in turn bolted to a mounting strut 34 extending from the engine proper and formed with an air bleed 36 and a coupling 38.

Figure 5:
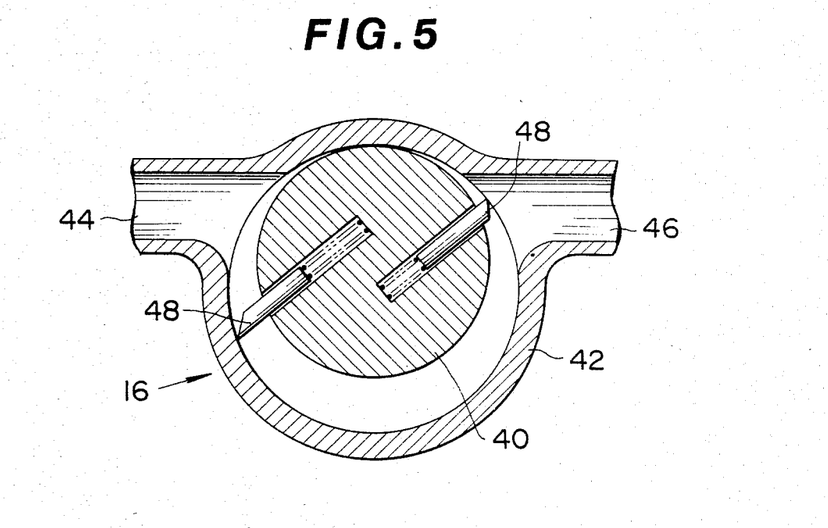
FIG. 5 is a sectional view of the pump utilized in the first embodiment.
Figure 6:
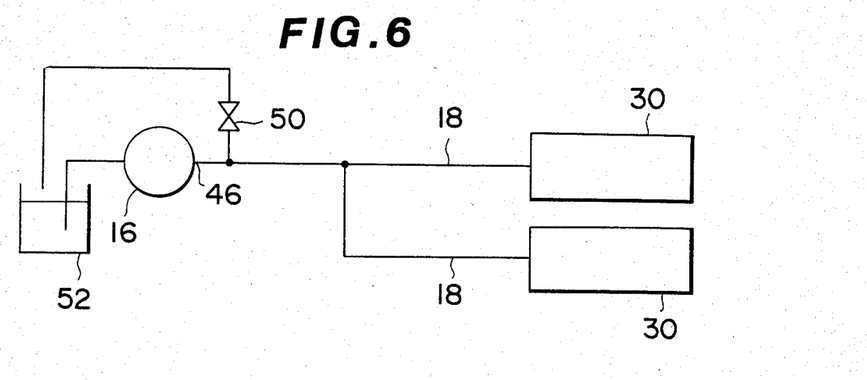
FIG. 6 is a schematic block diagram of the first embodiment.

FIG. 5 shows an example of a pulsation pump 16 suitable for use with the present invention. The pump is in this instance of the rotary type wherein a rotor 40 is disposed on a housing 42 and arranged to contact a specially curved portion of the inner wall of the housing in a manner to define a sealing interface which fluidly isolates a low pressure inlet port 44 from a high pressure discharge or outlet port 46. As shown, the rotor 40 in this case is provided with two vanes 48 which are spring loaded so as to constantly contact the wall of the pump housing. These vanes of course induce the discharge of two pressure pulsations per revolution (viz., one pulsation per vane).

In order to control the volume of hydraulic fluid discharged by the pump which is actually admitted to the insulator chambers, the first embodiment further includes a valve 50 (see FIG. 6) which is operatively interposed between the discharge port 46 of the pump 16 and the variable volume chambers 30 of the insulators 12. By appropriately adjusting this valve (50) the amount of fluid actually forced into the chambers 30 and the amount of fluid by-passed to a non-pressurized reservoir 52 can be controlled. This is deemed advantageous in that the pressurization may be adjusted both during initial mounting of the engine 10 on the chassis 11 and with the passing of time wherein the spring constant of the elastomeric member 24 of each of the mounting units are apt to change.

In more detail, the major or predominant vibration emitted by an internal combustion engine, as well known, varies with the number of cylinders and the number of combustions that occur per cycle. Thus, in the case of a single cylinder engine of the four cycle type wherein a single combustion occurs per 2 revolutions of the crankshaft, the major vibrational component is the so called "primary component" which exhibits a single sinusoidal wave per 2 revolutions, while in the case of 4, and 6 cylinder engines, the major components are respectively secondary and tertiary components (viz., those which exhibit 2 and 3 sinusoidal waves per 2 revolutions). Therefore, in the case of a four cylinder engine it is necessary to arrange for the pulsation pump 16 to produce one pressure pulsation per revolution of the engine 10. To do this, the number of pulsations produced by the pump 16 may be varied by varying the number of vanes 48 therein or via suitable gearing with respect to the engine crankshaft. In the first embodiment the latter method is chosen and the pulleys 54, 56 connected to the engine crank shaft and pump rotor are arranged so that the pump rotor rotates once per two revolutions of the engine.

It should be noted at this point that, for the sake of brevity, subsequent discussion will be directed only to engines of the four cylinder—four cycle type wherein the major vibrational component is the "secondary" one, it being deemed a simple matter for the one skilled in the art to adapt the teachings given in connection therewith, to any other given type of engine.

Figure 7:
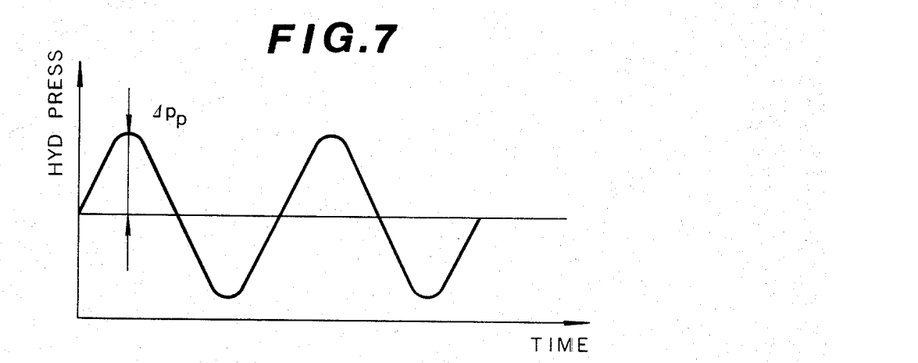
FIG. 7 is a graph showing in terms of hydraulic pressure and time, the output characteristics of the pump utilized in the first and second embodiments.
Figure 8:
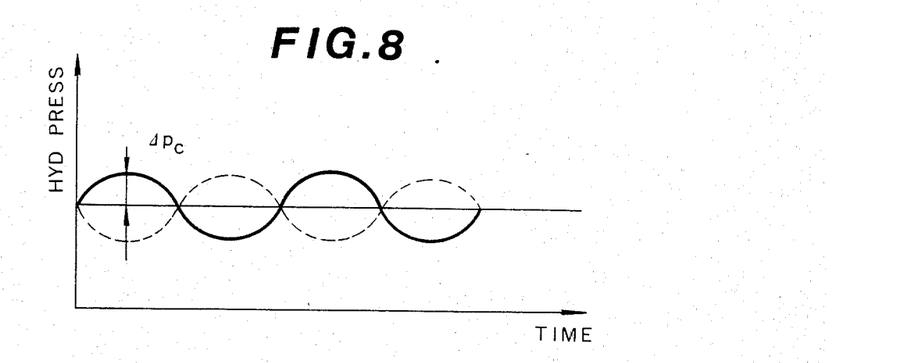
FIG. 8 is a graph showing in terms of hydraulic pressure and time, the neutralizing effect of pump produced pressure variations and those produced by engine vibration.

FIGS. 7 and 8 show (in solid line) respectively, the pressure outputted by the pump and the vibration induced pressure variations in the variable volume chambers of the mounting insulators. As seen, the pressure variation $\Delta P_p$ of the pump discharge is greater than the pressure variation $\Delta P_c$ produced by the vibration.

Therefore in the situation wherein:

"W" is the weight of the engine or vibrating body to be suspended by the suspension;

"K" is the spring constant of each of the insulators;

"S" is the effective pressure receiving area of the variable volume chambers;

"$P_c$" is the pressure prevailing in the variable volume chambers, the force "F" exerted on each of the insulators is given by:

$$F = K \cdot X$$

and it can be shown that:

$P_c = W/S$ (when the engine is not vibrating):

then, for a given relative displacement "X" between the engine 10 and the chassis 11 (which remains essentially constant over the 20–200 Hz vibrational range within which passager cabin resonance is apt to occur), it can be shown that:

$$\Delta P_c = (K \cdot X)/S.$$

Hence, the maximum and minimum discharge pressures of a pump may be modified, as previously pointed out, using the valve 50 whereby the pressure actually fed into the variable volume chambers 30 can be rendered equal to $(K \cdot X)/S$. Further, by adjusting the position of the pump rotor 40 with respect to the crankshaft pulley 54, as shown in FIG. 8, the pressure fed into the variable volume chambers 30 (shown by broken line curve) can be set equal in magnitude and 90 degrees out of phase with that produced by the vibration, whereby the pressure variations negate each other and a constant pressure is maintained within the variable volume chambers despite the distortion of same by the vibration of the engine.

Moreover, with the passing of time, as the elastomeric members 24 harded or otherwise deteriorate, the change in "K" may be easily accounted for simply by adjusting the valve 50 and varying the pressure permitted to reach the variable volume chambers.

Figure 9:
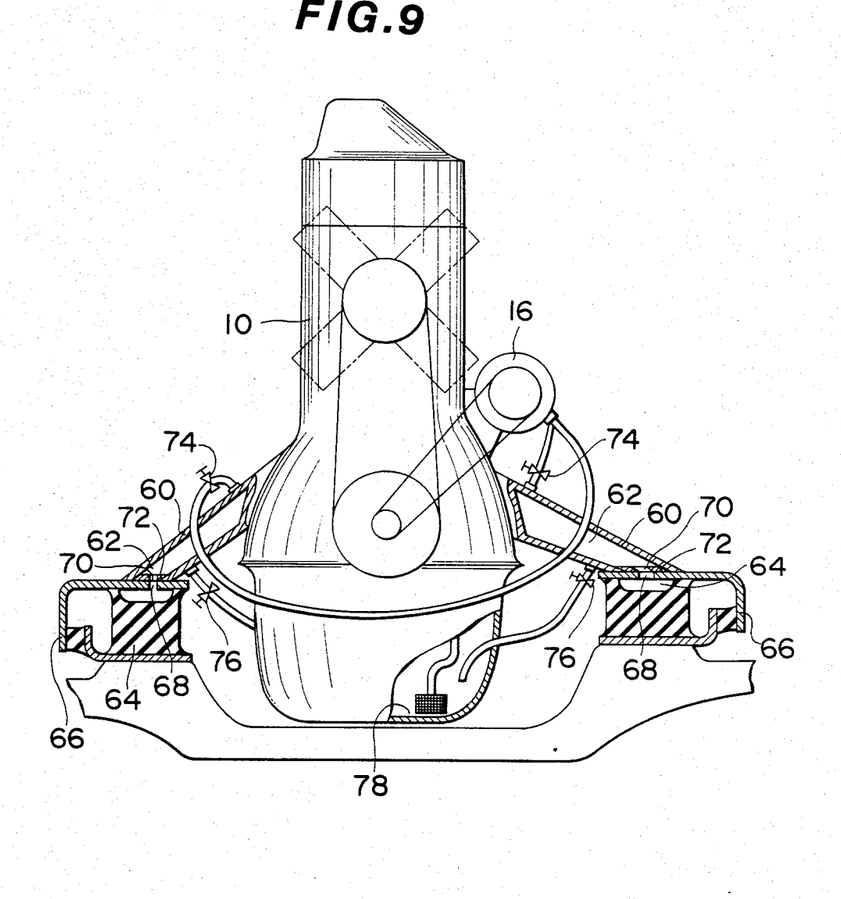
FIG. 9 is a front and partially sectioned elevation of a second embodiment of the present invention.
Figure 10:
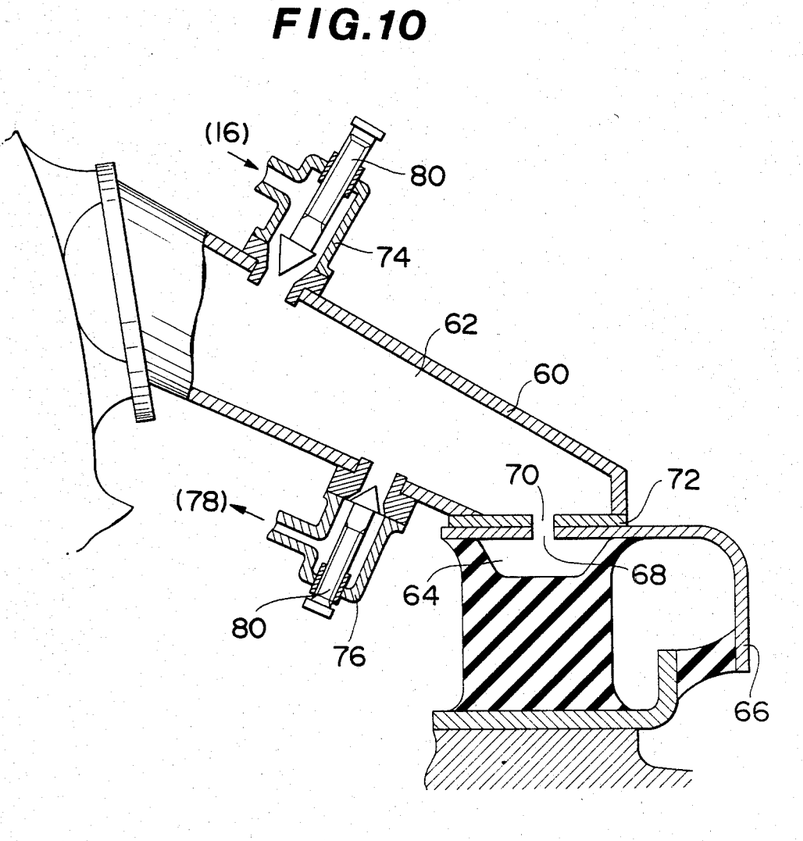
FIG. 10 is a sectional view of one of the insulator arrangements shown in FIG. 7.
Figure 11:
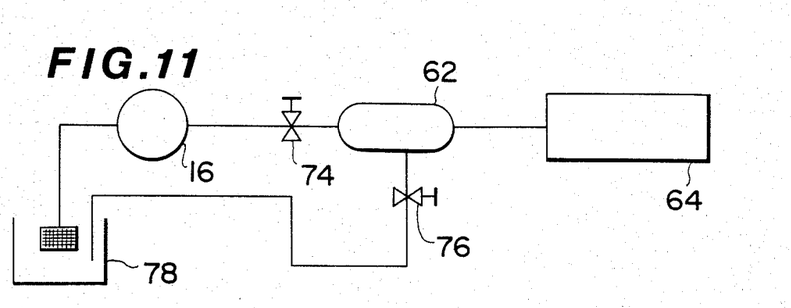
FIG. 11 is a schematic block diagram of the second embodiment.

FIGS. 9 and 10 show a second embodiment of the present invention. In this arrangement, the mounting struts or structural members 60 fixed to the engine proper 10 are hollow and used as high pressure reservoirs 62 between the pump 16 and each of the variable volume chambers 64. As shown, in this arrangement, the retaining bracket 66 is formed with an aperture 68 which cooperates with an aperture 70 formed in an end member 72 of the struts 60. These apertures (68, 70) are preferably of a diameter which induce a flow restriction between the reservoirs 62 and the variable volume chambers 64 and therefore smooth the transmission of pressure therebetween. Adjustable flow restricting or orifice valves 74 are arranged between the pump 16 and the high pressure reservoirs 62 while similar valves 76 are arranged to control the fluid communication between the reservoirs 62 and the sump 78 of the engine, which in this embodiment is employed as the fluid reservoir for the pump 16.

FIG. 10 shows one of the mounting struts 60 in detail. As will be appreciated from this figure, by rotating the valve stems 80 the clearance between the valve heads and the valve seats of each of the "inlet" and "outlet" orifice valves 74, 76 may be adjusted and thus the amount of pressurized hydraulic fluid admitted to and drained from the reservoirs 62 can be controlled whereby the volume of fluid actually pumped into the variable volume chambers 64 can be accordingly controlled.

The operation of this embodiment is basically the same as that of the first, wherein, as the engine 10 vibrates, the pump 16 produces pressure pulsations in a timed relationship with the rotational speed of the engine and therefore with a frequency selected to match the major vibrational frequency thereof. As the engine speed changes so does the output of the pump whereby vibration especially that which is apt to cause "booming" or resonance noise in the vehicle cabin, is effectively damped.

FIGS. 12 to 17 show a third embodiment of the present invention wherein automatic adjustment of the pressure prevailing within the high pressure reservoirs 62 is carried out in response to both the amplitude of the vibration produced by the engine and force exerted by the vibration on the insulators.

Figure 12:
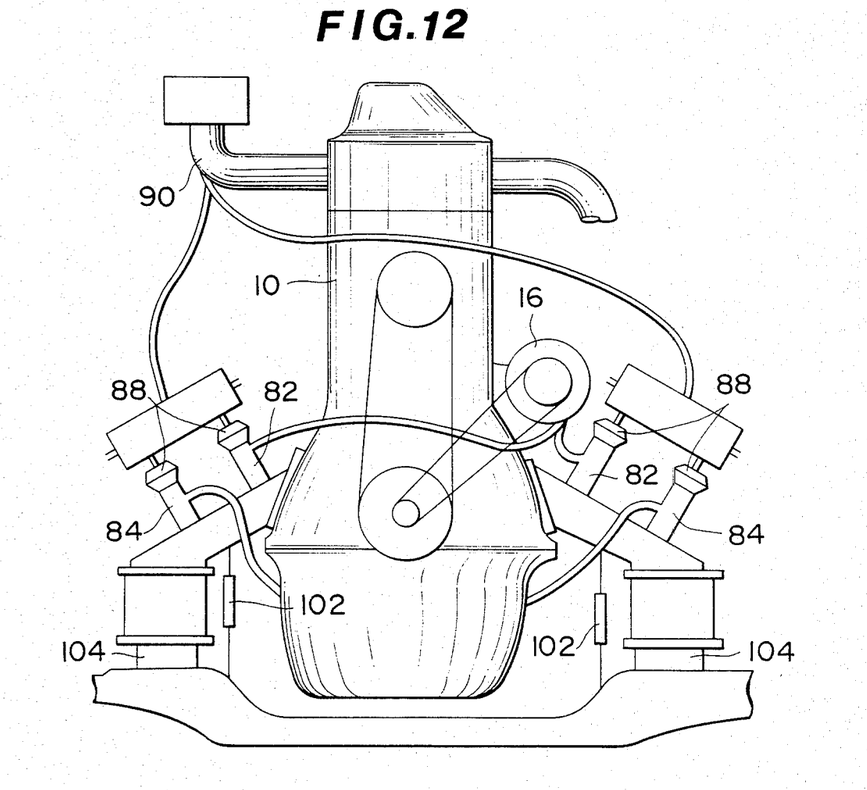
FIG. 12 is a front elevation of a third embodiment of the present invention.
Figure 13:
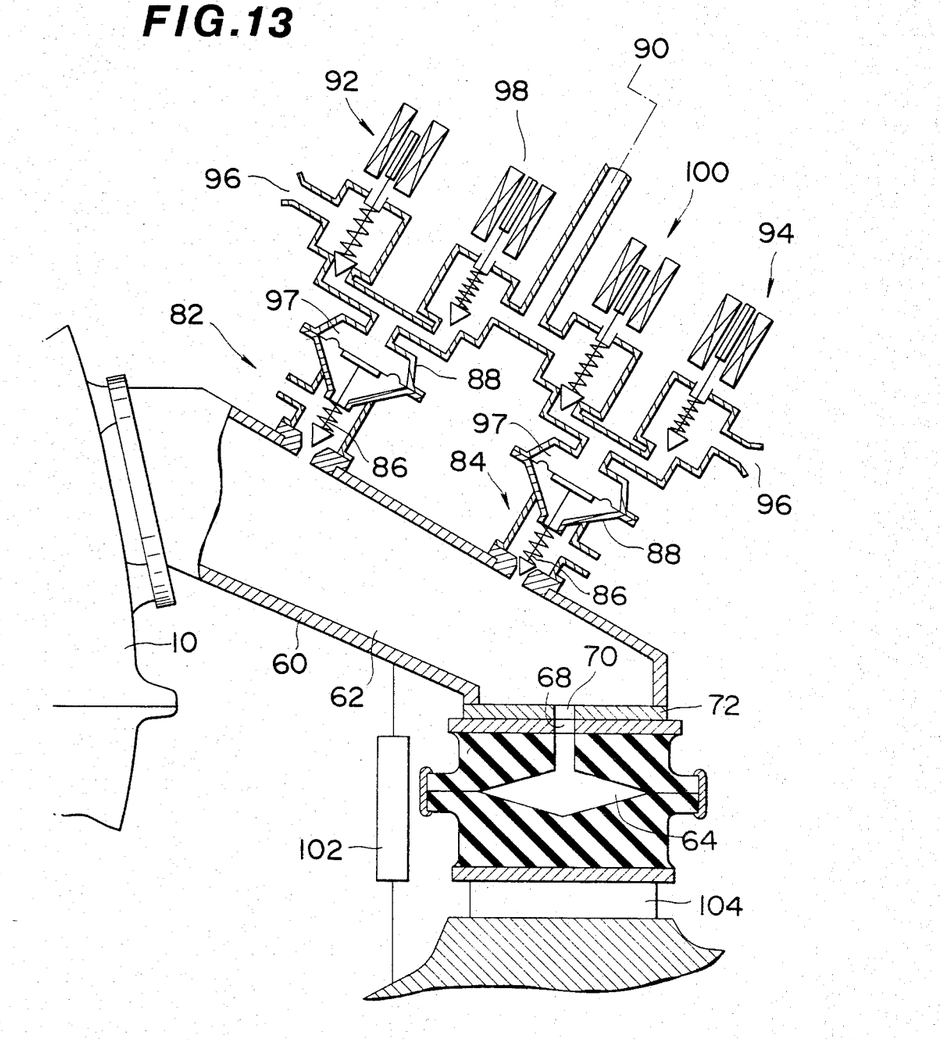
FIG. 13, is a sectional view of one of the mounting arrangements shown in FIG. 12.

In this embodiment the manually controlled valves 74, 76 are replaced by pressure motor operated units 82, 84. As shown these units each include a spring biased valve member 86 which is operatively connected to a vacuum or pressure motor 88. Each of the vacuum motors is arranged to communicate with a source of vacuum which in this case is tapped off from the induction manifold 90. Solenoid valves 92, 94, are arranged to control the communication between atmospheric ports 96 and the pressure chambers 97 of the vacuum motors while similar solenoid valves 98, 100 are arranged to control the communication between the induction manifold 90 and the vacuum or pressure chambers 97. As shown, these solenoid valves are arranged such that when energized the respective communication controlled thereby is established.

Displacement sensors 102 are operatively connected between the chassis 11 and each of the hollow struts 60. Force sensors 104 are interposed between the chassis 11 and bottom of each elastomeric insulator so as to indicate the force or load being applied thereto. These two types of sensors of course may be selected from a range of known units including those which employ stress responsive piezoelectric elements.

Figure 14:
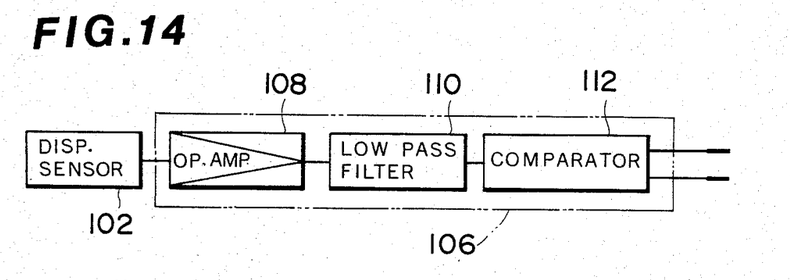
FIG. 14 is a block diagram of a circuit used to vary the pressurization/depressurization characteristics of the engine mounting arrangement shown in FIGS. 12 and 13, in response to changes in engine vibration amplitude.
Figure 16:
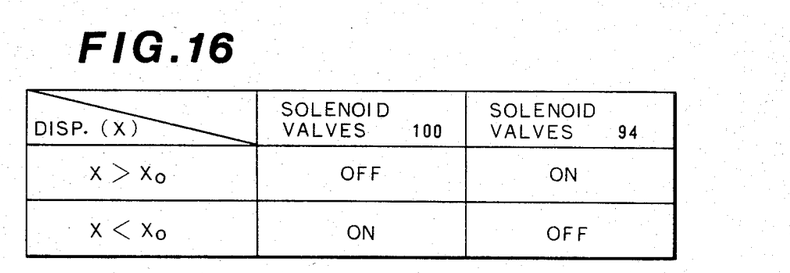
FIG. 16 is a table showing the relationship between amplitude of the vibration and the energization of solenoid valves of the third embodiment.

FIG. 14 shows an example of a circuit 106 suitable for controlling the operation of solenoid valves 94, 100 in response to the output of the displacement sensors 102. This circuit includes an operational amplifier 108 for receiving the output of a displacement sensor 102 and for in turn producing a corresponding pulse train. A low pass filter 110 is arranged to receive the output of the operational amplifier 108 and screen out signals having a frequency above a predetermined level. In this case the level is preferably in the region of 10 Hz. Following the low pass filter 110 is a comparator 112 which compares the output thereof with a signal indicative of a predetermined displacement $X_o$. Thus, as shown in the table of FIG. 16 when the sensed displacement "X" of the engine with respect to the chassis, exceeds the predetermined value $X_o$, then the solenoid valves 100 are de-energized while the solenoid valves 94 are energized. Conversely, upon the displacement of the engine being sensed as being less than the predetermined value, the solenoid valves 100 are energized while solenoid valves 94 are de-energized. With this arrangement, upon energization of the solenoid valves 94 air is admitted to the pressure chambers 97 allowing the valve members 86 to move toward the orifices 89 in a manner to increase the flow restriction therethrough, while upon energization of the solenoids 100, the induction vacuum is admitted to the pressure chambers 97 to induce the valve member to move away from the orifices 89, thus increasing the amount of fluid permitted to drain from the high pressure reservoirs 62.

Figure 15:
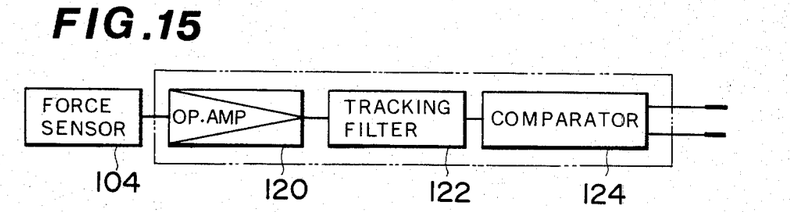
FIG. 15 is a block diagram of a circuit used to control the pressurization/depressurization of the mounting arrangement shown in FIG. 13, in response to changes in the force exerted on the mounting insulators by the engine vibration.
Figure 17:
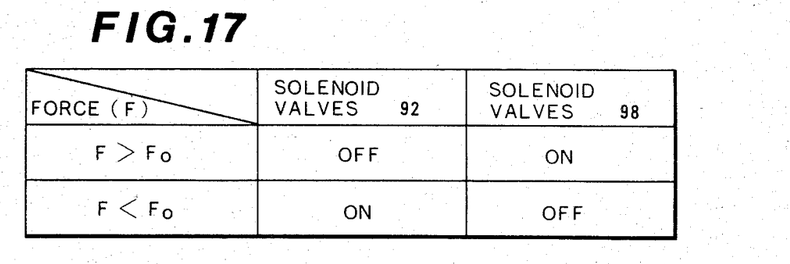
FIG. 17 is a table showing the relationship between the force produced by the vibration and the energization of solenoid valves of the third embodiment.

FIG. 15 shows an example of a circuit suitable for controlling the operation of the solenoid valves 92, 98. This circuit includes an operational amplifier 120 which receives the output of the force sensors 104 and produces an output which is fed to a tracking filter 122 which in turn is connected to a comparator 124. In this instance, the comparator 124 is arranged to compare the output of the tracking filter 122 with a reference value indicative of a predetermined load or force "$F_o$" on the insulators. Thus, as shown in table 17, upon the force or load on the insulators being sensed as exceeding the reference value the solenoid valve 98 is energized while the solenoid valve 92 is de-energized. Conversely, upon the force of load being sensed as being lower than the reference valve, the solenoid valve 92 is energized while solenoid valve 98 is de-energized. With this arrangement upon energization of the solenoid valve 92 atmospheric air is fed to the pressure chamber allowing the valve member to approach the orifice and restrict the communication between the pump and the high pressure reservoir. On the other hand, upon energization of the solenoid valve 98, induction vacuum is admitted to the pressure chamber inducing the valve member to move away from the orifice and increase the amount of fluid permitted to flow into the reservoir.

With the above arrangement, when the engine is idling and vibrating with a low frequency and large amplitude, the pressure in the high pressure reservoir and the insulators will suitably decrease, thus softening the suspension as a whole and induce suitable conditions for damping this kind of vibration. Further, if the vehicle in which the present invention is used, should traverse a rough road or the like, the bouncing of the engine on the insulators will be sensed and appropriate pressure modification carried out. Subsequent to the engine entering into a vibrational range wherein the force applied to the insulators increases and tends to induce cabin resonance, the increased force (which accordingly tends to produce higher peak pressures in the variable volume chambers) will be suitably neutralized by an increased pressure accordingly introduced into the high pressure reservoirs and insulator variable volume chambers.

Figure 18:
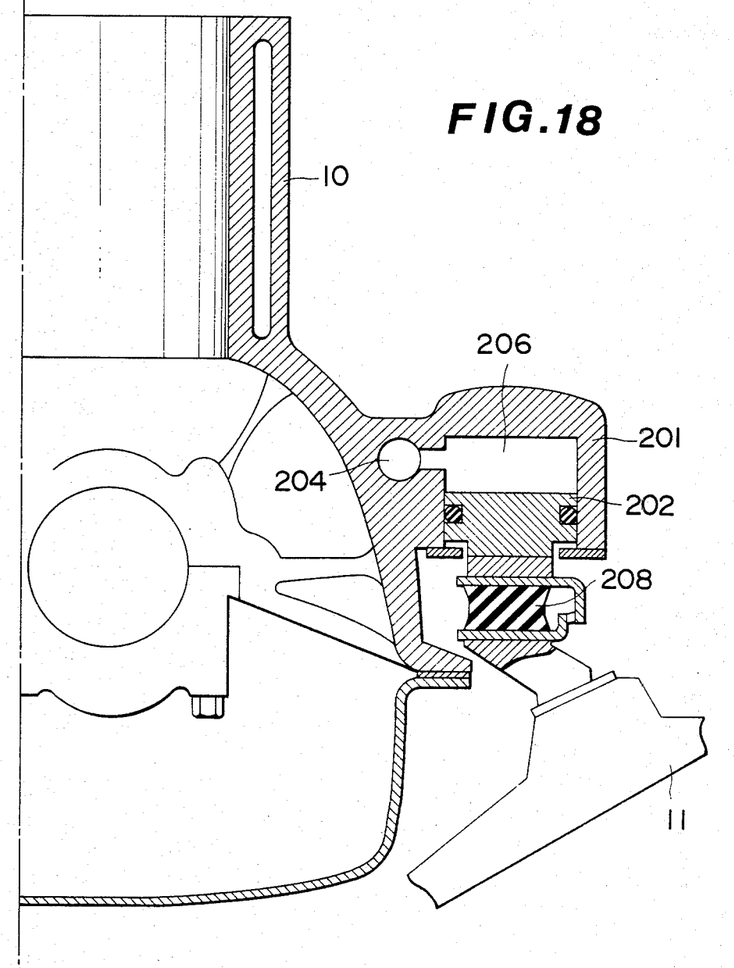
FIG. 18 is a sectional elevation of an engine equipped with a fourth embodiment of the present invention.

FIG. 18 shows a fourth embodiment of the present invention. In this arrangement each of the insulator units (only one shown) takes the form of a cylinder body 201 which is formed integrally with the engine proper and arranged to receive a piston 202 therein. Oil galleries 204 formed through the engine block provide fluid communication between the pulsation pump 16 (not shown) and each of the variable volume chambers 206 defined by the pistons 202 in the cylinder bodies 101. Elastomeric members 208 are as shown, interposed between the bottom of the piston 202 and the chassis 11.

The operation of this embodiment is such that as the engine vibrates the pulsation pump 16 provides offsetting pressure pulsations via the oil gallery 204 to the variable volume chamber. Hence, as the engine vibrates and moves in a direction which reduces the distance between it and the chassis, the pressure pulsations produced by the pulsation pump are phased so as to relieve the pressure build up in the variable volume chambers 206 which would otherwise occur as the cylinder bodies 201 move down around their respective pistons 202 and vice versa whereby the deformation of the elastomeric members 208 is minimized due to their series connection with the pistons 202. This accordingly allows for the spring constant of the elastomeric members to be smaller than the case wherein a variable volume chamber arrangement is not utilized.

Figure 19:
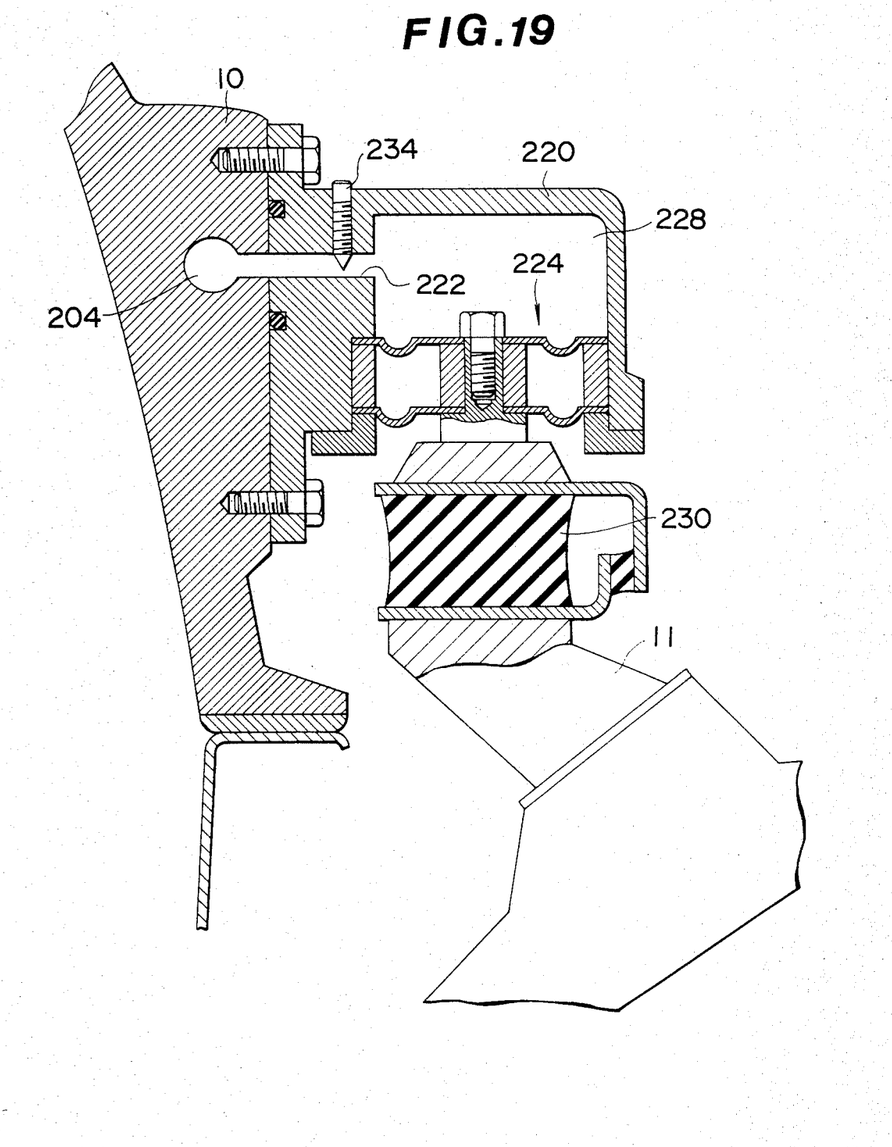
FIG. 19 is a sectional elevation of an engine equipped with a fifth embodiment of the present invention.

FIG. 19 shows a fifth embodiment of the present invention. In this arrangement each of the insulator units (only one shown) takes the form of a cylinder body 220 which is bolted to the side of the engine block 10 and formed with a bore 222 which communicates with an oil gallery 204. Double diaphragm arrangements 224 close the bores 226 formed in the cylinder bodies 220 to define therein variable volume chambers 228. Elastomeric insulator arrangements 230 similar to that used in the fourth embodiment are operatively connected between the vehicle chassis 11 and the diaphragm arrangements 224. In this embodiment the bores 222 via which the oil galleries communicate with the variable volume chambers 228 can be adjustably restricted using screws 234. This latter provision facilitates the individual adjustment of pressure variations within the chambers 228.

In the fourth and fifth embodiments, the oil gallery 204 replaces the high pressure reservoir 62 described in connection with the second and third embodiments and/or the conduiting of the first embodiment, and of course is equipped with a valve device or devices of the nature previously described for controlling the level of pressure prevailing therein and therefore amount of hydraulic fluid pumped into and out of the variable volume chambers thereof.

What is claimed is:

1. A mounting arrangement for suspending a vibrating body on a base member comprising:
   an insulator supportingly interposed between said vibrating body and said base member;
   means defining a variable volume chamber, said variable volume chamber defining means being connected in series with said insulator;
   a a pulsation pump which produces pressure pulsations in a timed relationship with a predominant vibration of said vibrating body;
   a non-pressurized reservoir communicating with said pulsation pump;
   means fluidly interconnecting said pulsation pump and said variable volume chamber; and
   valve means in said fluidly interconnecting means for varying the amount of fluid fed into said variable volume chamber per pulsation produced by said pulsation pump.

2. A mounting arrangement as claimed in claim 1, wherein said vibrating body is an internal combustion engine, said base member is a vehicle chassis and wherein said pulsation pump is mounted on the external surface of said engine, said pump being driven by a crankshaft of said engine.

3. A mounting arrangement as claimed in claim 2, wherein said pulsation pump is driven by a pulley located outside the engine proper and which is operatively connected with said crankshaft, said pulley and said pump being operatively connected by a belt.

4. A mounting arrangement as claimed in claim 1, wherein said insulator includes an elastomeric member, said variable volume defining means takes the form of a chamber formed in said elastomeric member, and said valve means takes the form of a single valve interposed between said pulsation pump and said variable volume chamber, said single valve being adjustable and arranged to control the amount of fluid under pressure discharged by said pulsation pump which is returned to said non-pressurized reservoir and therefore vary the pressure of the fluid which is fed to said variable volume chamber.

5. A mounting arrangement as claimed in claim 1, wherein said fluidly interconnecting means takes the form of a hollow strut fixedly mounted at one end to said vibrating body; wherein
   said insulator includes an elastomeric member which is interposed between the other end of said strut and said base member, and wherein
   said means defining a variable volume chamber takes the form of a chamber formed in said elastomeric member.

6. A mounting arrangement as claimed in claim 5, wherein said hollow strut and said variable volume chamber communicate through a flow restricting orifice.

7. A mounting arrangement as claimed in claim 5, wherein said valve means takes the form of:
   a first inlet orifice valve fluidly interposed between said strut and said pulsation pump, and
   a second outlet orifice valve which is fluidly interposed between said strut and said non-pressurized reservoir, said first and second orifice valves being adjustable to vary the pressure of the fluid retained in said hollow strut.

8. A mounting arrangement as claimed in claim 7, further comprising;
- a displacement sensor for sensing the displacement of said vibrating body with respect to said base member and outputting a signal indicative thereof;
- a force sensor interposed between said insulator and one of said vibrating body and said base member, for sensing the force applied to said insulator and outputting a signal indicative thereof;
- solenoid means associated with said first and second orifice valves for adjusting same; and
- circuit means operatively interconnecting said displacement sensor, said force sensor and said solenoid means and which is responsive to the output signals of said displacement and force sensors for operating said solenoid means according to a predetermined schedule.

9. A mounting arrangement as claimed in claim 1, wherein said variable volume defining means takes the form of:
- a cylinder body formed integrally with said vibrating body;
- a piston reciprocatively disposed in said cylinder body to define said variable volume chamber, wherein
- said insulator includes an elastomeric member interposed between said piston and said base member, and wherein
- said fluidly interconnecting means takes the form of a fluid gallery formed in the vibrating body per se, said fluid gallery being arranged to continuously communicate with said variable volume chamber.

10. A mounting arrangement as claimed in claim 1, wherein said variable volume defining means takes the form of:
- a cylinder body detachably connected to said vibrating body and a diaphragm disposed in said cylinder body to define said variable volume chamber, wherein
- said insulator includes and elastomeric body which is operatively connected between said diaphragm and said base member, and wherein
- said fluidly interconnecting means takes the form of a fluid gallery formed in said vibrating body, said fluid gallery constantly communicating with said variable volume chamber through a bore in which an adjustable flow restriction is disposed.

11. A mounting arrangement for suspending a vibrating body on a base member comprising:
- an elastomeric member interposed between said vibrating body and said base member;
- a variable volume chamber formed within said elastomeric member;
- a source of hydraulic fluid pressure which source produces pressure pulsations in a timed relationship with a predominant vibration of said vibrating body, said source including a non-pressurized reservoir;
- a hollow strut interposed between said vibrating body and said elastomeric member, one end of said hollow strut being fixedly mounted to said vibrating body, and the other end of said strut being mounted to said insulator, said hollow strut defining means for fluidly interconnecting said source and said variable volume chamber;
- a flow restricting orifice fluidly interposed betwen said hollow strut and said variable volume chamber; and
- valve means in said hollow sturt for varying the amount of fluid fed into said variable volume chamber per pulsation.

12. A mounting arrangement for suspending a vibrating body on a base member comprising:
- an elastomeric member interposed between said vibrating body and said base member;
- a variable volume chamber formed within said elastomeric member;
- a source of hydraulic fluid under pressure which source produces pressure pulsations in a timed relationship with a predominant vibration of said vibrating body, said source including a non-pressurized reservoir;
- a hollow strut interposed between said vibrating body and said elastomeric member, one end of said hollow strut being fixedly mounted to said vibrating body, and the other end of said strut being mounted to said insulator, said hollow strut defining means for fluidly interconnecting said source and said variable volume chamber; and
- valve means in said hollow strut for varying the amount of fluid fed into said variable volume chamber per pulsation, said valve means including a first inlet orifice valve fluidly interposed between said strut and said source of fluid under pressure, and a second outlet orifice valve which is fluidly interposed between said strut and said non-pressurized reservoir, said first and second orifice valves being adjustable to vary the pressure of the fluid retained in said hollow strut.

13. A mounting arrangement as claimed in claim 12, further comprising;
- a displacement sensor for sensing the displacement of said vibrating body with respect to said base member and outputting a signal indicative thereof;
- a force sensor interposed between said insulator and one of said vibrating body and said base member, for sensing the force applied to said insulator and outputting a signal indicative thereof;
- solenoid means associated with said first and second orifice valves for adjusting same; and
- circuit means operatively interconnecting said displacement sensor, said force sensor and said solenoid means and which is responsive to the output signals of said displacement and force sensors for operating said solenoid means according to a predetermined schedule.

* * * * *